United States Patent [19]
Schick et al.

[11] Patent Number: 5,377,867
[45] Date of Patent: Jan. 3, 1995

[54] SELECTOR PIN SEED METER

[75] Inventors: Jeffrey C. Schick, Davenport, Iowa; James I. Lodico, Hampton, Ill.

[73] Assignee: Deere & Company, Moline, Ill.

[21] Appl. No.: 166,753

[22] Filed: Dec. 13, 1993

[51] Int. Cl.6 ............................................. A01C 9/00
[52] U.S. Cl. ...................................... 221/217; 111/77
[58] Field of Search ............... 221/76, 254, 217, 219, 221/220; 111/77, 78

[56] References Cited

U.S. PATENT DOCUMENTS

| | | | |
|---|---|---|---|
| 1,501,335 | 7/1924 | Hartenstein | 221/217 |
| 3,486,659 | 12/1969 | Beebe et al. | 221/277 |
| 3,552,601 | 1/1971 | Hansen et al. | 221/219 |
| 3,572,548 | 3/1971 | Fuchs et al. | 221/225 |
| 3,670,671 | 6/1972 | Lienemann et al. | 111/77 |
| 3,717,940 | 2/1973 | Wylie et al. | 221/219 |
| 4,282,985 | 8/1981 | Yamamoto | 221/254 |
| 4,609,131 | 9/1986 | Tieben | 222/278 |
| 4,924,786 | 5/1990 | Keeton | 111/184 |
| 5,027,725 | 7/1991 | Keeton | 111/184 |
| 5,058,766 | 10/1991 | Deckler | 221/254 |

Primary Examiner—Kenneth W. Noland

[57] ABSTRACT

The present invention is directed to a seed meter for corn. The seed meter comprises a stationary casing with two rotatably mounted discs. The casing is provided with a seed receiving zone in communication with a inlet, and a seed discharge zone in communication with an outlet. The casing is also provided with a stationary camming surface. The first disc is provided with a plurality of spring biassed selector pins. Each pin has an engagement surface and a cam follower surface. The cam follower surface engaging the camming surface. The second disc which rotates with and is parallel to the first disc is provided with a plurality of seed cells corresponding to the selector pins. A flexible and resilient membrane covers the seed cells. In operation, the discs are continuously rotated through the seed receiving and discharge zones. As a selector pin is driven towards the corresponding seed cell by the camming surface, the pin traps a single seed in the membrane covered seed cell. The seed is released when the pin is rotated into the discharge zone.

13 Claims, 2 Drawing Sheets

SELECTOR PIN SEED METER

BACKGROUND OF THE INVENTION

1. Field of the Invention

The invention is directed to a mechanical seed meter using cam driven pins to select and single seeds from a seed puddle in the seed receiving zone and releasing the seeds in the seed discharge zone.

2. Description of the Prior Art

In the United States the vast majority of crops are planted with row crop planters, grain drills or air seeders. Row crop planters are designed to place seeds in rows far enough apart to permit the control of weeds by cultivation and to improve harvesting efficiency. Grain drills and air seeders are used in solid planting, when row spacing is too close to permit cultivating or other cultural practices.

All three seeding machines, meter seed so it can be planted uniformly in a field. The row crop planters usually have the more sophisticated metering equipment for singling seeds, whereas the drills and air seeders use volumetric meters which apply a fixed volume of seed per linear foot.

Singling mechanical seed meters used on planters include seed plate meters, finger pickup meters and "brush meters". A seed plate seed meter is a mechanical seed meter having a rotating plate located at the bottom of the seed hopper. The plate is provided with seed cells in which the corn is trapped. If the cells are the correct size only one seed will be trapped in each cell. The plate is then rotated over the discharge area and the seed released. U.S. Pat. Nos. 3,486,659, 4,282,985, and 4,609,131 disclose various configurations for seed plate type seed meters.

Another mechanical seed meter is the finger pickup seed meter. This meter is used for corn and comprises a series of fingers that pass through the seed reservoir. The fingers are initially open in the seed reservoir and then close trapping seed between the fingers and a stationary plate. Additional seed trapped by the fingers is removed by passing the fingers over indentations in the stationary plate as the seed is transported to the discharge area where the finger is opened releasing the seed. This type of finger pickup meter is disclosed in U.S. Pat. No. 3,552,601. Other types of finger pickup meters are disclosed in U.S. Pat. Nos. 3,572,548 and 3,670,671.

Recently "brush meters" have been used for metering soybeans. A vertical rotating seed plate having a plurality of seed cells around its periphery passes through the seed reservoir. Seed is trapped in the seed cells by brushes. Examples of the meters are disclosed in U.S. Pat. Nos. 4,924,786, 5,027,725 and 5,058,766.

SUMMARY

It is an object of the present invention to provide a simple mechanical seed meter for metering corn seeds.

The present invention comprises a hollow stationary casing in which two parallel discs are rotatively mounted. A stationary camming surface is mounted to the casing. The first disc is provided with a plurality of spring biassed pins. Each pin has a cam follower surface and a seed engagement surface. The cam follower surface is biassed into contact with the stationary camming surface. The second disc is provided with a plurality of seed cells located opposite the selector pins. The cells are covered with a flexible and resilient membrane.

During operation, the discs are rotated through a seed receiving zone and a seed discharge zone in the casing. As a pin enters the seed receiving zone from the discharge zone the pins are biased away from the seed cells. As it continues to pass through the seed puddle formed in the seed receiving zone, the selector pin is driven towards the seed cell trapping a seed between the pin and the membrane covered cell. The trapped seed would then be rotated out of the puddle into the discharge zone when the pin would be retracted and the seed released.

DETAILED DESCRIPTION

Figure 1:
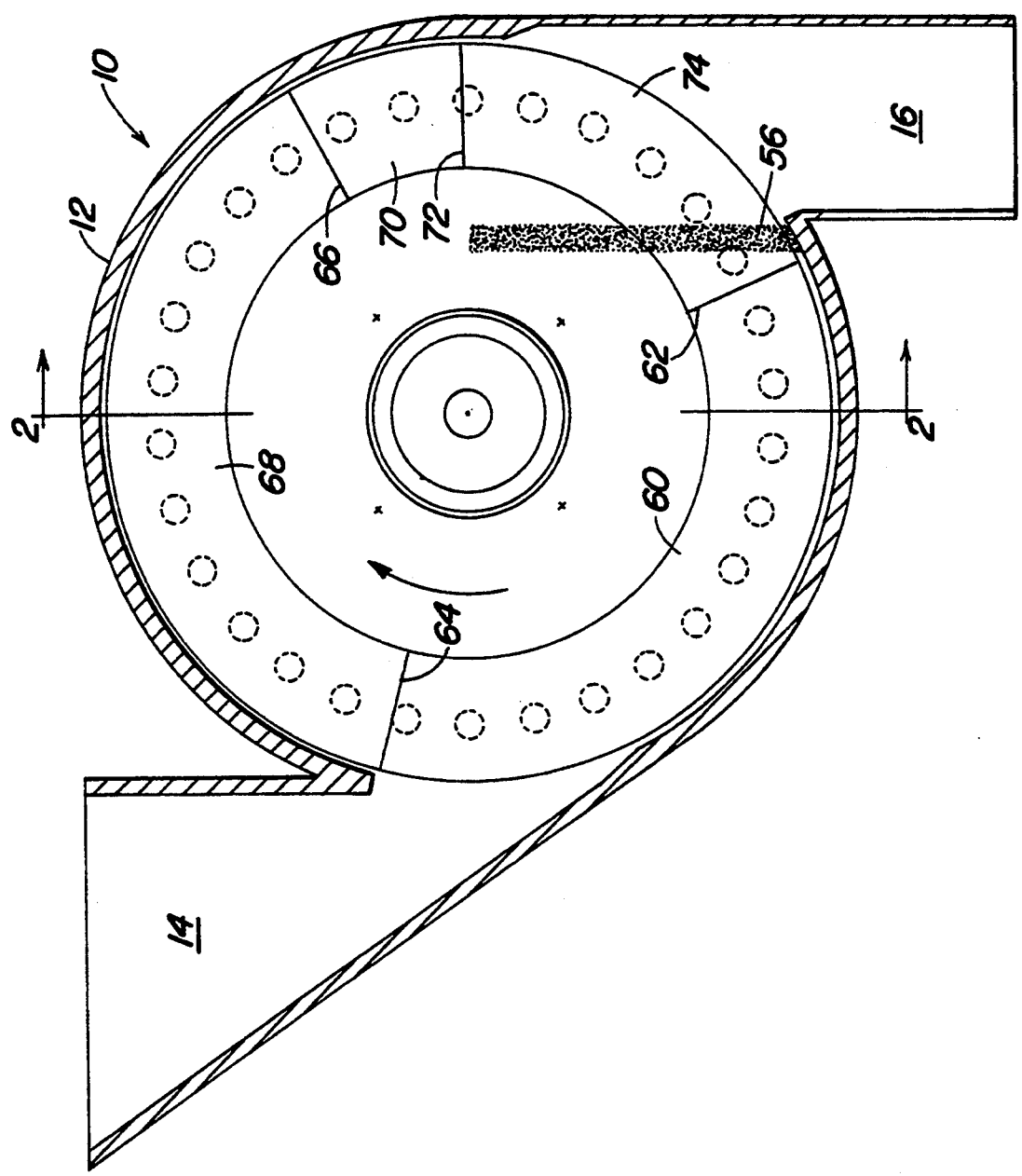
FIG. 1 is an open side view of the subject seed meter.
Figure 3:
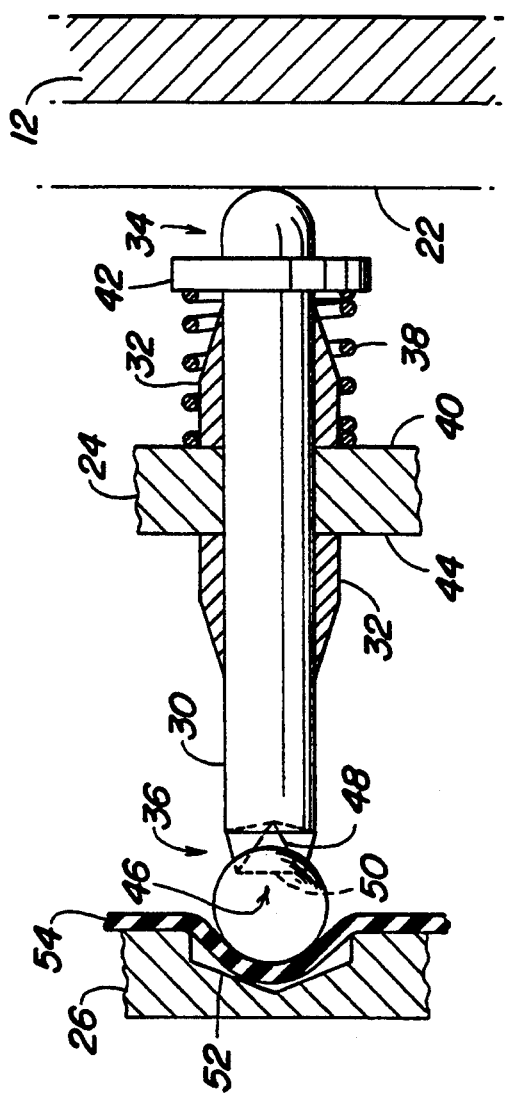
FIG. 3 is a detail view of a selector pin and seed cell.
Figure 2:
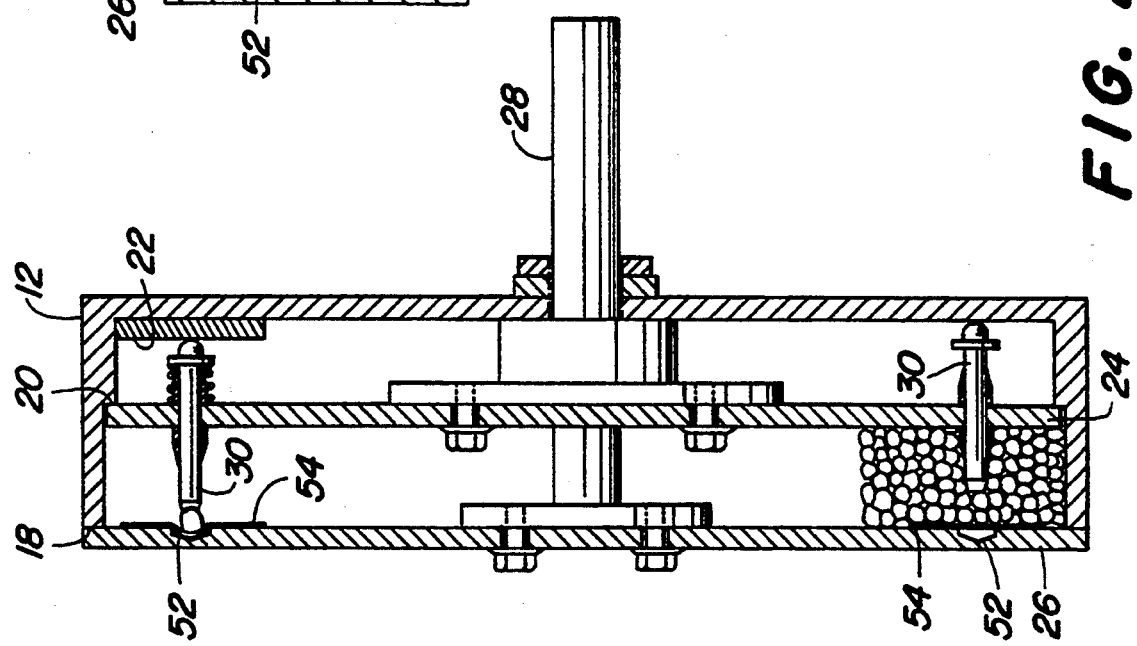
FIG. 2 is a cross sectional frontal view of the subject seed meter.

The seed meter 10 of the present invention comprises a stationary casing 12 having an inlet 14 and an outlet 16. The casing has an open side with an outer rim 18. In addition the casing has an inner ledge or shoulder 20. A camming surface 22 is mounted to the inside surface of the casing.

First and second discs 24 and 26, respectively, are rotatively mounted in the casing 12 by drive shaft 28. The first disc 24 is the pin selector disc and is provided with a plurality of selector pins 30. Each of the pins 30 is mounted in a guide tube 32 attached to the disc. Each pin 30 has a cam follower side 34 and an engagement side 36. The cam follower side is semi spherical and engages camming surface 22. The pin is biassed against the camming surface by biassing spring 38 which extends between the cam follower side 40 of the disc 24 and pin flange 42. The selector pin 30 projects from the cam follower side 40 through the disc 24 to the seed engagement side 44. The pin is provided with an engagement surface 46. The engagement surface 46 is formed by an internal conical surface 48 formed in the pin 30 which creates a circular rim engagement surface 50 for engaging the individual seeds.

The second disc 26 rotates with the first disc and is parallel to the first disc 24. The second disc 26 is provided with a plurality of seed cells 52 corresponding to the selector pins 30 in the first disc 24. The cells are covered with a flexible and resilient membrane 54. Seeds may be of different sizes and the resilient membrane provides a mechanism to accommodate small and large seeds.

The outer peripheral edge of the first disc 24 rides on the inner ledge or shoulder 20 of the casing 12. The outer peripheral edge of the second disc 26 rides on the outer rim 18 of the casing 12. Seed received from the inlet 14 forms a seed puddle in the bottom of the casing 12 between the two rotating discs 24 and 26. A sealing brush 56 is positioned between the two rotating discs 24 and 26 to prevent seed from short circuiting the meter and directly entering the outlet 16. The brush 56 is mounted to the stationary casing 12 and extends upwardly therefrom. The brush is provided with transverse bristles through which the disengaged selector pins 30 pass as they are rotated from the discharge area to the seed engagement area.

The camming surface 22 is provided with a seed engagement ramp 60 located between break lines 62 and 64. As the selector pins 30 pass through the seed puddle, ramp 60 drives the pins towards the membrane covered seed cells 52 until a seed is trapped by the pin in the cell. Between break lines 64 and 66 the camming is provided with a holding zone 68 in which the seeds are held in seed cells 52 by the selector pins 30. A discharge ramp 70 is formed between break lines 66 and 72 in which the ramp falls away from the discs and the biassing spring 38 pulls the selector pin 30 away from the seed so it is released into attached outlet 16. An open zone is formed between break lines 72 and 62 where the selector pins are biassed away from the second disc 26.

As the discs are rotated from the discharge zone to the seed receiving zone the selector pins 30 are biassed away from the seed cells 52. Seeds pass between the pins 30 and the seed cells 52 as the discs are rotated through the seed puddle in the seed receiving zone. While in the seed puddle, the camming surface 22 starts driving the selector pins 30 towards the seed cells 52 trapping a seed in the membrane covered seed cell 52. This trapped seed is retained by the pin 30 until the seed reaches the discharge zone, where it is released.

It should be noted that the selector pins 30 maybe spring biassed towards the seed cells 52. In such a configuration the camming surface 22 would be used to drive the selector pins 30 away from the seed cells 52 to release the seeds in the discharge zone.

The present invention should not be limited by the above described embodiments, but should be limited solely by the claims that follow.

We claim:

1. A seed meter for metering seed for seeding equipment, the seed meter comprising:
    a stationary casing having an inlet and an outlet, the casing being provided with a seed receiving zone and a seed discharge zone, the seed receiving zone is in communication with the inlet and the seed discharge zone is in communication with the outlet;
    a first disc being rotatively mounted in the casing, the first disc is provided with a plurality of spring biassed selector pins located on the disc, each pin has an engagement surface and a cam follower surface, the disc having a cam follower side and an engagement side;
    a second disc being rotatively mounted in the casing, the second disc rotates with the first disc, the second disc is provided with a plurality of seed cells opposite the selector pins; and
    a stationary camming surface is located across from the cam follower side of the first disc and engages the cam follower surface of the selector pins, whereby the camming surface drives the selector pins towards the seed cells trapping seeds in the cells, as the selector pin is rotated through the seed receiving zone and releases the selector pins when the selector pins are rotated into the seed discharge zone.

2. A seed meter as defined by claim 1 wherein the seed cells are covered by a flexible and resilient membrane against which the seeds are held in position by the selector pins.

3. A seed meter as defined by claim 2 wherein the selector pins are biassed into engagement with the camming surface.

4. A seed meter as defined by claim 3 wherein the engagement surfaces of the selector pins have an internal conical surface which provides a rim engagement surface for engaging a seed.

5. A seed meter as defined by claim 4 wherein the first and second discs are parallel to one another.

6. A seed meter as defined by claim 5 wherein the first and second discs are rotated by the same drive shaft.

7. A seed meter as defined by claim 6 wherein the second disc is provided with an outer peripheral edge and the casing has an outer rim which engages the outer peripheral edge of the second disc.

8. A seed meter as defined by claim 7 wherein the first disc is provided with an outer peripheral edge and the casing has an inner ledge which engages the outer peripheral edge of the first disc.

9. A seed meter for metering seed for seeding equipment, the seed meter comprising:
    a casing having an inlet and an outlet, the casing being provided with a seed receiving zone in communication with the inlet and a seed discharge zone in communication with the outlet;
    a first disc being rotatively mounted in the casing, the first disc having a plurality of selector pins, each pin having a seed engagement surface and a cam follower surface;
    a second disc being rotatively mounted in the casing, the second disc rotates with the first disc, the second disc is provided with a plurality of seed cells corresponding to the selector pins of the first disc; and
    camming and biassing means for driving the selector pins towards and away from the seed cells for trapping and releasing seeds.

10. A seed meter as defined by claim 9 wherein the seed cells are covered with a flexible and resilient membrane, against which the seeds are held by the selector pins.

11. A seed meter as defined by claim 10 wherein the seed engagement surface of the selector pin has an internal conical surface which provides a rim engagement surface for engaging a seed.

12. A seed meter as defined by claim 11 wherein the first and second discs are parallel to one another.

13. A seed meter as defined by claim 12 wherein the first and second discs are rotated by the same drive shaft.

* * * * *